United States Patent Office 3,811,968
Patented May 21, 1974

3,811,968
POLYMERIZATION CROSSLINKING AGENT FOR POLYBUTADIENE PROPELLANT PREPOLYMERS
David C. Sayles, Huntsville, Ala., assignor to the United States of America as represented by the Secretary of the Army
No Drawing. Filed July 21, 1967, Ser. No. 655,737
Int. Cl. C06d 5/06
U.S. Cl. 149—19.9
9 Claims

ABSTRACT OF THE DISCLOSURE

A novel crosslinking agent for crosslinking carboxyl-terminated polybutadiene propellant prepolymers. The invention employs tert-butylperoxyisopropyl carbonate in conjunction with various difunctional or trifunctional aziridinyl chain extension agents (e.g., the butyleneimine adduct of trimesic acid) to simultaneously chain extend and crosslink the polybutadiene propellant prepolymers. The elastomer product is useful as a binder for solid propellants.

BACKGROUND OF THE INVENTION

This invention relates to a new crosslinking agent and, in particular, to one for crosslinking carboxyl-terminated polybutadiene prepolymers.

Hydrocarbon elastomers are highly desirable as binders for solid propellants because of their excellent fuel value. Such elastomers have been achieved through the use of hydrocarbons such as butadiene which have been polymerized with a difunctional or trifunctional chain extension agent. The copolymer is then cured to an elastomer.

However, the residual unsaturated linkages in the elastomer tend to react with oxygen and produce a brittle elastomer which will not function efficiently with conventional igniter mechanisms. This has led, of necessity, to the development of expensive and complicated igniter mechanisms which will function satisfactorily with the brittle elastomer.

Additionally, the use of difunctional and trifunctional chain extension agents has resulted in problems in the processing of the propellant and in the properties of the final propellant. In particular, the initial polymerization rates are not fast enough while eventual uncontrollable polymerization rates are encountered; volume shrinkage occurs as the propellant undergoes curing; the temperature exotherm of the propellant is too low; the required curing temperature of the propellant is too high; and the processing of the propellant is difficult because of the inadequate amount of liquid ingredients available for mixing purposes. The density of propellants derivable with such chain extension agents is considerably less than the theoretical density; the tensile strength and the modulus of elasticity of the propellant are not high enough; and post-cure effects occur as the propellant undergoes aging.

Accordingly, an object of this invention is to provide a new and improved polymerization crosslinking agent for crosslinking carboxyl-terminated polybutadiene propellant prepolymers.

Another object of this invention is to provide such a crosslinking agent that will act as an effective initiator to produce a faster initial rate of polymerization and that will also act to reduce the risk of uncontrollable polymerization rates normally encountered with difunctional and trifunctional chain extension agents.

Still another object of this invention is to provide such a crosslinking agent that will reduce volume shrinkage of the propellant as the propellant is cured, produce a higher temperature exotherm and a lower required curing temperature for the propellant, and allow for easier processing of the propellant.

Yet another object of this invention is to provide such a crosslinking agent that will produce a higher density propellant, leave no post-cure defects as the propellant undergoes aging and improve the tensile strength and modulus of elasticity of the propellant.

SUMMARY OF THE INVENTION

Tert-butylperoxyisopropyl carbonate is used in conjunction with various difunctional or trifunctional aziridinyl chain extension agents (e.g., the butyleneimine adduct of trimesic acid) to simultaneously chain extend and crosslink polybutadiene propellant binders.

These and other objects and advantages of this invention will become more readily understood and appreciated as the same becomes better understood by reference to the following detailed description.

DESCRIPTION OF THE PREFERRED EMBODIMENTS

The tert-butylperoxyisopropyl carbonate is used in this invention as an additive to a propellant formulation to effect crosslinking of the residual unsaturated linkages remaining in the carboxyl-terminated polybutadiene prepolymers.

Tert-butylperoxyisopropyl carbonate,

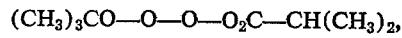

$(CH_3)_3CO—O—O—O_2C—CH(CH_3)_2$, is obtained by the reaction of tert-butylhydroperoxide and isopropyl chloroformate in the presence of base at 0°–5° C. from which the product separates as an oil phase. It is then washed and dried. The method of manufacture is described by Strain F. et al., Journal of the American Chemical Society 72, 1254 (1950), and Strain F. (to Pittsburgh Plate Glass Company), U.S. Pat. 2,374,789 (May 1, 1945). The product can be purified of di-tert-butyl peroxide and tert-butyl hydroperoxide by volatilizing these lower boiling components by mild heating under reduced pressure. Tert-butylperoxyisopropyl carbonate is also commercially available.

A representative propellant formulation that contains tert-butylperoxyisopropyl carbonate is as follows (Composition A is the prior art propellant formulation and Composition B is the same composition with tert-butylperoxyisopropyl carbonate added thereto):

| Ingredient | Composition (wt. percent) | |
| --- | --- | --- |
| | A | B |
| Ammonium perchlorate | 72.0 | 72.0 |
| Aluminum | 14.0 | 14.0 |
| Carboxyl-terminated polybutadiene prepolymer | 13.3 | 13.0 |
| Tris(methylaziridinyl)phosphine oxide | 0.3 | 0.3 |
| Tris(oxiranyl)-para-aminophenol | 0.3 | 0.3 |
| Iron linoleate | 0.1 | 0.1 |
| Tert-butylperoxyisopropyl carbonate | 0.0 | 0.3 |

In compositions A and B, tris(oxiranyl)-para-aminophenol and tris-(methylaziridinyl)phosphine oxide are both used as trifunctional chain extension agents. However, either one of these trifunctional chain extension agents can be used alone.

As indicated earlier, a difunctional aziridinyl chain extension agent (e.g., the butyleneimine adduct or trimesic acid) can be used instead of a trifunctional chain extension agent. The polybutadiene prepolymer of the butadiene monomer must have at least two terminal carboxyl groups.

The polybutadiene prepolymer can be formed from the butadiene monomer by any conventional method. The preferred method is to use a peroxide such as glutaryl (glutaric) peroxide. However, the use of other polymerization methods, such as those disclosed in U.S. Pats. Nos. 3,087,844 and 3,293,209, may also be employed.

Again, the polybutadiene prepolymer must have at least two terminal carboxyl groups.

The reaction of the *tert*-butylperoxyisopropyl carbonate with the polybutadiene prepolymer takes place at the alkenic linkages in the molecule. Preferential reaction at the vinyl site occurs. This can be illustrated by the following chemical equations:

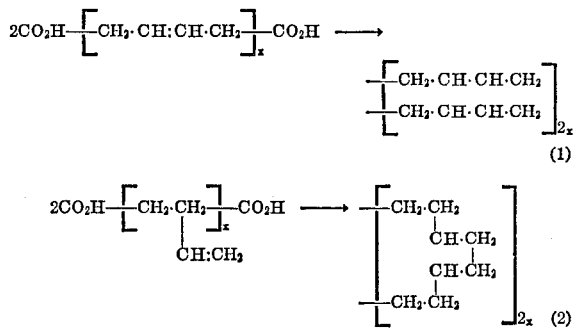

Equation (1) represents the reaction of the 1,4 addition prepolymer of butadiene with *tert*-butylperoxyisopropyl carbonate.

Equation (2) represents the same reaction for the 1,2 addition prepolymer. Obviously, both prepolymers are present in the polybutadiene prepolymer.

The use of *tert*-butylperoxyisopropyl carbonate in conjunction with difunctional or trifunctional chain extension agents has the following advantages. It:

1. reduces the risk of uncontrollable polymerization rates being encountered with the chain extension agent,
2. produces a higher density (closer to the theoretical density) propellant than derivable with the chain extension agent alone,
3. produces a faster initial rate of polymerization because the organic peroxide functions as an effective initiator for unsaturated linkages,
4. produces no post-cure effects as the propellant undergoes aging since the peroxide decomposes as the propellant is maintained at cure temperature,
5. reduces volume shrinkage of the propellant as it is cured,
6. produces a lower temperature exotherm,
7. results in a lower curing temperature,
8. achieves an improvement in tensile strength and in the modulus of elasticity of the propellant, and
9. allows for easier processing since the organic peroxide is liquid and will augment the amount of liquid ingredients available for mixing purposes.

Ammonium perchlorate is the preferred inorganic oxidizing salt. Other inorganic oxidizing salts may be employed instead. Particularly useful inorganic oxidizing salts include the ammonium, alkali metal, and alkaline earth metal salts of nitric, perchloric and chloric acids and mixtures thereof, such as sodium, potassium, magnesium and ammonium perchlorates, lithium and strontium chlorates, and potassium, sodium, calcium and ammonium nitrates.

Various other modifications and variations of this invention will occur to those skilled in the art in the light of the above teachings, which modifications and variations are within the spirit and scope of this invention.

I claim:

1. A solid propellant composition comprising an inorganic oxidizing salt and a synthetic solid binder formed by reacting an uncured polybutadiene prepolymer of a butadiene monomer, said polybutadiene prepolymer having at least two terminally positioned carboxyl groups, with a reactant material in sufficient amount to provide a solid propellant structure on reacting with said polybutadiene prepolymer, said material comprising *tert*-butylperoxyisopropyl carbonate and a difunctional or trifunctional aziridinyl chain extension agent.

2. The composition of claim 1 wherein said chain extension agent is a difunctional aziridinyl chain extension agent.

3. The composition of claim 2 wherein said difunctional chain extension agent is the butyleneimine adduct of trimesic acid.

4. The composition of claim 3 wherein said inorganic oxidizing salt is ammonium perchlorate.

5. The composition of claim 1 wherein said chain extension agent is a trifunctional aziridinyl chain extension agent.

6. The composition of claim 5 wherein said trifunctional chain extension agent is tris(methylaziridinyl) phosphine oxide.

7. The composition of claim 6 wherein said inorganic oxidizing salt is ammonium perchlorate.

8. The composition of claim 5 wherein said trifunctional chain extension agent is tris(oxiranyl)-*para*-aminophenol.

9. The composition of claim 8 wherein said inorganic oxidizing salt is ammonium perchlorate.

References Cited
UNITED STATES PATENTS

| | | | |
|---|---|---|---|
| 3,087,844 | 4/1963 | Hudson et al. | 149—19 |
| 3,147,161 | 9/1964 | Abere et al. | 149—19 |
| 3,155,552 | 11/1964 | Vriesen | 149—19 |
| 3,087,844 | 4/1963 | Hudson et al. | 149—19 |
| 3,203,842 | 8/1965 | Godfrey | 149—19 |
| 3,305,523 | 2/1967 | Burnside | 149—19 X |

BENJAMIN R. PADGETT, Primary Examiner